Feb. 23, 1954
P. F. DRAGON
2,670,222
PIPE COUPLING
Filed Dec. 12, 1949
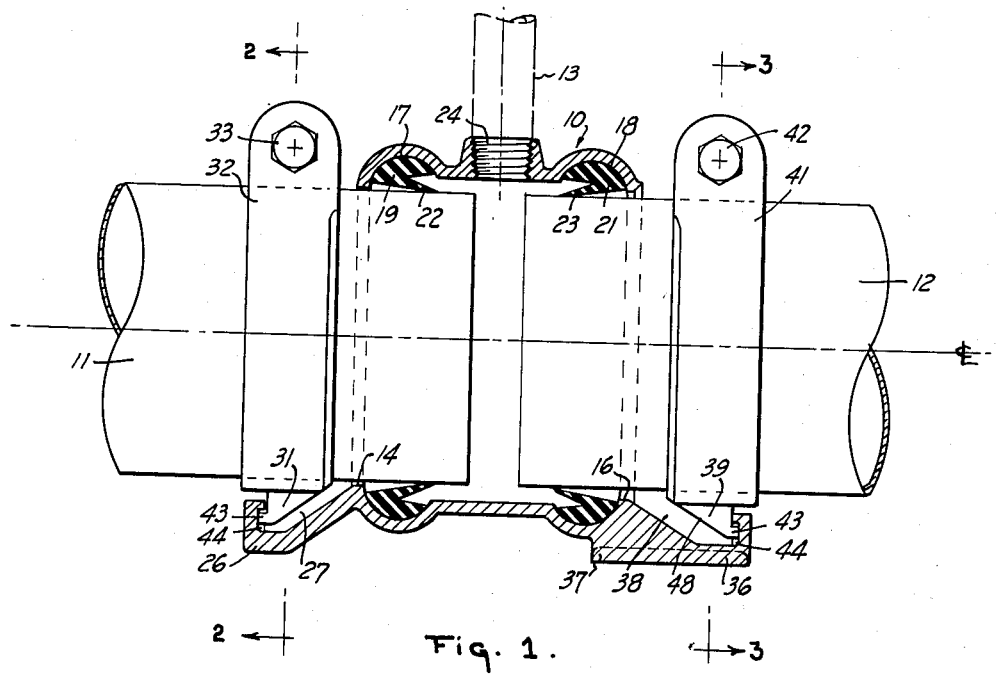
Fig. 1.
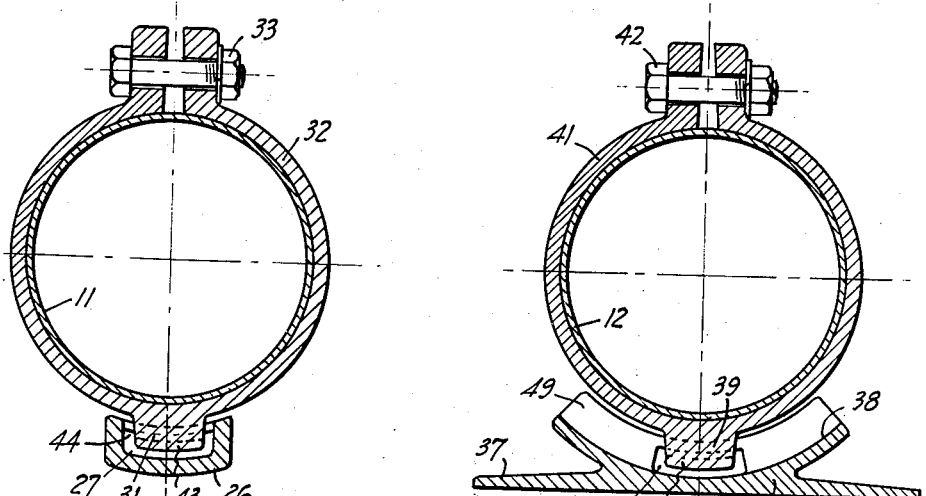
Fig. 2.
Fig. 3.
INVENTOR.
Peter F. Dragon
BY
ATTORNEYS Patented Feb. 23, 1954

2,670,222

UNITED STATES PATENT OFFICE 2,670,222

PIPE COUPLING

Peter F. Dragon, Oakland, Calif.

Application December 12, 1949, Serial No. 132,501

3 Claims. (Cl. 285—175)

This invention relates to improvements in pipe couplings and especially to quick interlocking and releasable couplings for use in connection with separable pipes such as used in irrigation projects.

In irrigation of land for the purpose of irrigating growing crops, it has been determined that water supplied by sprinkler heads or perforated sprinkler pipes possesses certain advantages over the conventional system of flooding. The use of easily connectable and disconnectable surface pipes provided with upstanding sprinkler elements provides rain-like irrigation. However, where such sprinkler systems are employed, it is necessary to shift the pipe frequently. In order to facilitate such shifting, comparatively short lengths of pipe are used and it is obvious that such pipes must be provided with quickly detachable couplings. In addition, the couplings should provide sufficient flexibility in the line to permit the pipe line to follow the uneven contours of the earth and to permit the pipe to be laid along a desired path, whether curved or straight.

It is an object of the present invention to simplify coupling construction and provide pressure tight couplings which may be secured to pipe in a simple and quick manner.

A further object of this invention is to provide a coupling which may be coupled and uncoupled with the least effort and skill.

Other objects and advantages will appear from the following specification taken in conjunction with the accompanying drawing in which:

Figure 1 is a cross-sectional side elevational view of my coupling;

Figure 2 is a cross-sectional view taken along the line 2—2 of Figure 1; and

Figure 3 is a cross-sectional detail taken along the line 3—3 of Figure 1.

As shown in Figure 1, coupling housing 10 is adapted to join two lengths of irrigation pipe 11 and 12 in such a manner that they may be quickly coupled and uncoupled for easy transportation to other parts of the field. The housing 10 is intended to provide a leak-proof joint between the portions of pipe 11 and 12 and may, as illustrated, also provide a base for a riser pipe 13 to the upper end of which there is connected a sprinkler (not shown).

As illustrated in Figure 1, housing 10 comprises a hollow member which is provided with openings 14 and 16 which are adapted to accommodate the ends of pipes 11 and 12 respectively. The diameter of the openings 14 and 16 exceeds the outside diameter of the pipes 11 and 12 to allow easy insertion of the ends of the pipes 11 and 12 therethrough. It will be noted, however, for example, that the opening 14, in the preferred embodiment, is only slightly larger than the outside diameter of pipe 11, as I have found that it is desirable not to provide too much play between the housing 10 and the pipe 11. This is for the reason that the housing 10 is more or less permanently secured to the pipe 11 for transportation as a unit about a field.

The opening 16 which is adapted to accommodate the pipe 12, is preferably of substantially larger diameter than the outer diameter of pipe 12. This is for the reason that the pipe 12 is customarily removed from the housing 10 and it is obvious that the larger the opening 16, the more easily the pipe 12 may be inserted or removed. In addition, the larger opening 16 permits a greater degree of movement of the pipe 12 with respect to the coupling 10, thereby allowing sufficient flexibility in the union to permit a run of pipe to accommodate itself to varying terrain or direction.

Immediately adjacent the openings 14 and 16, the housing 10 is provided with a pair of annular recesses 17 and 18 respectively which form seats for gaskets 19 and 21. The gaskets 19 and 21 are identical and, as indicated, are provided with lips 22 and 23 which are flexible and which are adapted to bear against the ends of the pipes 11 and 12, and to provide a seal therearound. The gaskets 19 and 21 are preferably made of rubber or some other suitable material, preferably resilient, deformable and flexible. The surfaces of the gaskets 19 and 21 which engage the recesses 17 and 18 respectively are preferably designed to form a waterproof seal therewith. It will be noted that the gaskets 19 and 21 are designed in such manner that pressure within the housing 10 will be transferred to the gaskets and will tend to urge the lips 22 and 23 into watertight engagement with the pipes 11 and 12 and with the housing 10.

As illustrated, the housing 10 is provided with a threaded orifice 24 which is adapted to accommodate the riser 13. In the event the riser is not to be utilized it will be appreciated that a plug may be inserted therein.

At that end of the housing 10 which is adapted to receive the pipe 11 (and to which the pipe is more or less permanently secured) there is provided an outwardly extending member 26 which, as shown, forms a base to support one end of the housing 10 and which is further provided with a slot 27 of limited circumferential length having a center coincident with the center of pipe 11. The slot 27 is of sufficient size to receive a lug 31 upon the split ring 32 which is secured to the pipe 11 as by means of a nut and bolt combination 33, which when tightened will serve to increase the frictional engagement between the split ring 32 and the pipe 11. Since the orifice 14 is only slightly larger than the outside diameter of the pipe 11, there will not be sufficient play or looseness between the housing 10 and the pipe 11 to permit the lug 31 to be removed from the slot 27 when once the lug 31 has been inserted in slot 27 and the split ring 32 has been secured to the pipe 11. In practice, the method of coupling the housing 10 to the pipe 11 consists in first inserting the gasket 19 in the annular recess 17. The split ring is then positioned adjacent the opening 14 with the lug 31 inserted in the slot 27. Pipe 11 is then passed through the split ring 32 and the opening 14 into engagement with the gasket 19 in the housing 10, substantially as shown in Figure 1. The split ring 32 is then tightened about the pipe 11.

The end of the housing 10 adjacent the opening 16 is likewise provided with a member 36. Member 36 serves as a support for the end of housing 10 remote from member 26 and, as shown particularly in Figure 3, is provided with an outwardly extending foot member 37 which is of sufficient length to provide a support against rotation of the entire assembly with respect to the ground upon which the assembly is laid.

The member 36 is provided with an open-ended slot 38, having a center which is coincident with the center of the pipe 12 as shown in Figure 3. The open-ended slot 38 is adapted to receive a lug 39 upon a split ring 41 which is adapted to be secured to the pipe 12. The split ring 41 is adapted to be drawn together by the nut and bolt combination 42, to frictionally engage the pipe 12 and, to all intents and purposes, become a part thereof. The pipe 12 is inserted into the housing 10 simply by introducing the end of the pipe 12 through the orifice 16 in such a manner that it engages the gasket 21 substantially as shown. The pipe 12 is twisted about its longitudinal axis in such a manner that the lug 39 clears the end of the member 36. The pipe 12 is then rotated so that the lug 39 enters the open-ended slot 38.

The split rings 41 and 32 are substantially identical. The lugs 31 and 39 on both the rings 32 and 41 are provided with identical lips 43 which are adapted to fit in identical recesses 44 in the walls of the slots 27 and 38 respectively. When the lips 43 engage the recesses 44, it is obvious that rotation of the pipes 11 and 12 with respect to the coupling body 10 is prevented.

When the pipes 11 and 12 are connected to a source of water under pressure the following occurs: The water pressure is exerted against the lips 22 and 23 of the gaskets 19 and 21 respectively. The lips 22 and 23 are urged into engagement with the pipes 11 and 12 and provide a waterproof seal between the gasket and the pipe. Pressure against the lips 22 and 23 serves to urge the gaskets 19 and 21 into engagement with the recesses 17 and 18 respectively and to prevent leakage between the gaskets and the housing 10. In addition, pressure within the housing 10 will tend to urge the pipes 11 and 12 apart. This results in urging the lugs 31 and 39 outwardly against the end walls of the slots 27 and 38, with the result that further separation of the pipes 11 and 12 is prevented. However, when the lug 39 engages the outer wall of the slot 38, there will occur a jamming or camming action of the split ring 41 about the point of engagement of the lug 39 and the wall of the slot 38. This will increase the frictional engagement between the ring 41 and the pipe 12 and will serve further to prevent the pipe 12 from being removed from both the ring 41 and the housing 10.

Previously I have indicated herein that the pipe 12 is particularly adapted to be inserted within the housing 10 by inserting the same through the opening 16 in such a manner that the lug 39 is introduced into the open-ended slot 38 by rotating the pipe 12 about its longitudinal axis. However, it will be noted that the face 48 of the lug 39 slopes sharply. When the pipe 12 is inserted in the housing 10 through the orifice 16 with the lug 39 extending downwardly, the surface 48 engages the outer end 49 of the member 36. The sloping surface 48 will cause the lug 39 to ride upwardly and over the end wall of the member 36. When the lug 39 has ridden completely over the end wall of the member 36, the lug 39 will drop downwardly into the slot 38.

Operation of the device may briefly be described as follows: The split ring 32 is placed adjacent the housing 10 in such a manner that the lug 31 thereon rests in the slot 27. The pipe 11 is then passed through the split ring 32 and the orifice 14 so that it engages the lips 22 of the gasket 17. The split ring 32 is then tightened upon pipe 11. In this manner the pipe 11 is substantially permanently secured to the housing 10 until the nut and bolt combination 33 is loosened in order that the split ring 32 no longer frictionally engages the pipe 11.

The split ring 41 is secured to the pipe 12 sufficiently far from the end thereof that the end may be passed through the orifice 16 and into the housing 10 substantially to the distance shown in Figure 1. The pipe 12 may be inserted in the housing 10 in one of two manners. The first manner is that in which the pipe 12 is rotated about its longitudinal axis sufficiently far that a lug 39 on the split ring 41 will clear the ends of the member 36 when the end of the pipe 12 is introduced through the orifice 16 into the housing 10 to engage the gasket 21. The pipe 12 is then rotated about its longitudinal axis until the lug 39 is received within the open-ended slot 38 and the lip 43 is in substantial registry with the recess 44.

The second manner of introducing the pipe 12 into the housing 10 is to first insert the end of the pipe 12 into the orifice 16 with the pipe 12 positioned in such a manner that the lug 39 on the split ring 41 extends downwardly. The flat surface 48 engages the point 49 on the member 36 and, when the pipe 12 is moved longitudinally toward the housing 10, the lug 39 rides over the member 36 until the lug 39 drops downwardly into the slot 38.

When water is introduced through the pipes 11 and 12, the pressure of the water serves to urge the lips 22 and 23 on the gaskets 19 and 21 respectively into engagement with the pipes and the interior of the housing, thereby creating a leakproof seal between the gasket and the housing and the pipes. As has previously been explained, the pressure likewise tends to urge the pipes 11 and 12 apart. However, such movement is limited by the engagement of the lugs 31 and 39 with the walls of the slots 27 and 38.

When uncoupling of the pipes 11 and 12 is desired, the water pressure within the tank will, in all probability, have been reduced. The pipe 12 is then rotated so that the lug 39 clears the open-ended slot 38. The pipe 12 may then be withdrawn from the housing 10. The pipes may then be moved to a new location and be assembled as has previously been explained.

I claim:

1. In a pipe coupling, a body, a flow passage through said body, an opening in one end of said body adapted to receive one end of an irrigation pipe, said opening having a substantially larger diameter than the outer diameter of the pipe connected thereto, an annular recess in said body adjacent said opening adapted to accommodate a gasket, a gasket in said recess adapted to engage one end of said pipe, a ground engaging base formed on said body adjacent said opening and extending longitudinally of the body, said base being formed to provide an arcuate open-ended slot having a center coincident with the center of the adjacent pipe, a clamp ring adapted to be secured to said adjacent end of the pipe, a lug on said clamp ring which by turning of the pipe is adapted to be positioned in said slot to lock the pipe against longitudinal movement, a recess formed in said base, said recess being in communication with said slot and facing said opening in said body, a lip formed on said lug and adapted to engage said recess to lock the pipe against rotational movement.

2. In a pipe coupling, a body, a flow passage through said body, an opening in one end of said body adapted to receive one end of an irrigation pipe, said opening having a slightly larger diameter than the outer diameter of the pipe connected thereto, an annular recess in said body adjacent said opening adapted to accommodate a gasket, a gasket in said recess adapted to engage one end of said pipe, an outwardly extending member formed integral with the body and extending longitudinally of the same, said member being formed to provide an arcuate slot of limited circumferential length and having a center coincident with the center of the adjacent pipe, a clamp ring adapted to be secured to said adjacent end of the pipe, a lug on said clamp ring adapted to be positioned in said slot to lock the pipe against longitudinal movement, a recess formed in said member, said recess being in communication with said slot and facing said opening in said body, a lip formed on said lug and adapted to engage said recess to lock the pipe against rotational movement.

3. In a pipe coupling, a body, a flow passage through said body, a pair of openings in opposite ends of said body adapted to receive the ends of adjacent sections of irrigation pipe, the first of said openings having a substantially larger diameter than the outer diameter of the pipe connected thereto, the second of said openings having a slightly larger diameter than the outer diameter of the pipe connected thereto, a pair of annular recesses in said housing adjacent said openings and adapted to accommodate a pair of gaskets in said recesses, said gaskets being provided with inwardly extending lips adapted to engage the ends of said pipes, a ground engaging base formed integral with said body adjacent to said substantially larger opening and extending longitudinally of the body, said base being formed to provide an arcuate open-ended slot having a center coincident with the center of the adjacent pipe, a clamp ring adapted to be secured to the adjacent end of the pipe, a lug on said clamp ring which by turning of the pipe is adapted to be positioned in said slot to lock the pipe against longitudinal movement, a recess formed in said base, said recess being in communication with said slot and facing said substantially larger opening in said body, a lip formed on said lug adapted to engage said recess to lock the pipe against rotational movement, an outwardly extending member formed integral with the body and adjacent said slightly larger opening, said member being formed to provide an arcuate slot of limited circumferential length and having a center coincident with the center of the adjacent pipe, a clamp ring adapted to be secured to said adjacent end of the pipe, a lug on said clamp ring adapted to be positioned in said slot to lock the adjacent pipe against longitudinal movement, a recess formed in said member, said recess being in communication with said slot and facing said slightly larger opening in said body, a lip formed on said lug and adapted to engage said last named recess to lock the adjacent pipe against rotational movement.

PETER F. DRAGON.

References Cited in the file of this patent

UNITED STATES PATENTS

| Number | Name | Date |
| --- | --- | --- |
| 486,118 | McElroy | Nov. 15, 1892 |
| 954,348 | Schaefer | Apr. 5, 1910 |
| 1,130,726 | Greve | Mar. 9, 1915 |
| 1,213,518 | McEwen | Jan. 23, 1917 |
| 2,244,396 | Kellaher | June 3, 1941 |
| 2,449,735 | Wyss | Sept. 21, 1948 |
| 2,469,538 | Young | May 10, 1949 |
| 2,470,539 | Wyss | May 17, 1949 |
| 2,494,854 | Anderson | Jan. 17, 1950 |
| 2,505,631 | Webster | Apr. 25, 1950 |